United States Patent Office 3,629,425
Patented Dec. 21, 1971

---

3,629,425
STABILIZED 2-PAM SOLUTIONS
Anwar A. Hussain, Plattsburg, N.Y., assignor to American Home Products Corporation, New York, N.Y.
No Drawing. Filed Nov. 14, 1968, Ser. No. 775,911
Int. Cl. A61k 27/00
U.S. Cl. 424—263     11 Claims

ABSTRACT OF THE DISCLOSURE

There are disclosed herein concentrated aqueous solutions of 2-PAM salts with mineral acids optionally also containing up to 0.5 percent of atropine, stabilized by addition of mineral acid to a final pH of 1.0 to 3.0. Solutions of 2-PAM salts with or without atropine stabilized in this manner are many times more stable than solutions prepared in the conventional way.

---

This invention relates to the preparation of concentrated 2-formyl-1-methylpyridinium oxime (2-PAM) salt solutions intended for parenteral administration and possessing adequate stability for this purpose. More particularly, this invention relates to the stabilization of 2-PAM salt solution containing at least 10% w./v. of the 2–PAM salt, and from 0 to 0.5% w./v. of atropine sulfate. These solutions are intended for human use as antidotes in cases of acute poisoning arising from accidental or intentional exposure to various cholinesterase inhibitors.

A number of organophosphate compounds are being used presently in agriculture as potent insecticides. Moreover, several of the most potent chemical warfare agents, known as nerve gases, are organophosphates. The organophosphates generally enter the body by absorption through the lungs, gastrointestinal tract or skin; as a result of inhalation of dusts or aerosols, ingestion of liquid sprays or concentrates, or skin contact. Once in the body the organophosphates react with cholinesterase to yield a phosphorylated cholinesterase which is no longer capable of hydrolyzing acetylcholine. The resulting abnormal accumulation of acetylcholine in the body gives rise to both muscarinic and nicotinic effects, leading to eventual paralysis of the respiratory system and death.

Two medicinal agents have been found useful in counteracting the effects induced by cholinesterase inhibitors. Atropine sulfate, used at a dose of 2 to 4 mg., has been shown to be effective in overcoming the muscarinic effect at the ends of the postganglionic nerves, but does not affect the neuromuscular block leading to respiratory failure. On the other hand, 2-PAM salts, used in doses ranging from 0.2 gm. to 8 gm. depending upon degree of exposure to the cholinesterase inhibitor, have been shown to augment atropine therapy by effectively regenerating inactivated cholinesterase. Regeneration of inactivated cholinesterase by 2-PAM has been demonstrated both in vitro and in vivo, and arises from preferential attack by the 2-PAM moiety on the bond between cholinesterase and the phosphate grouping, resulting in hydrolysis of the inactive specie to yield the parent active cholinesterase and non-toxic phosphates. Thus, in cases of severe organophosphate poisoning the treatment of choice is a combination of atropine sulfate and 2-PAM salt, used at an appropriate dose level.

Once body cholinesterase is inactivated through exposure to and reaction with organophosphates, the phosphorylated enzyme undergoes further reaction with time, known as "aging." This aging phenomenon is believed to be due to dealkylation of the phosphate ester, the resulting compound being much more resistant to hydrolysis by 2-PAM salts. Thus it is imperative that severe cases of organophosphate poisoning be treated as quickly as possible in order to minimize the "aging" effect and thus obtain maximum regeneration of cholinesterase. Because of the relatively rapid onset and severity of symptoms arising from overexposure to organophosphates, and the irreversible aging of the phosphorylated enzyme, therapeutic blood levels of the antidote must be obtained as soon after exposure as possible. The results of blood level studies in man indicate that incomplete absorption of 2-PAM occurs from the gastrointestinal tract and that oral administration to obtain a therapeutic blood concentration requires a considerably larger dose than that needed with parenteral routes. Furthermore, it has been demonstrated that peak blood levels are obtained immediately with intravenous administration, within fifteen minutes following intramuscular administration, but only after two to four hours following oral dosing. Thus, the administration route of choice for both atropine and 2-PAM is by intravenous or intramuscular injection, and parenteral dosage forms of these important antidotes are required for this purpose.

Suitable parenteral forms must possess pharmaceutical elegance, must be well tolerated by the patient, and should possess adequate chemical stability. The latter criterion depends on a number of factors including storage temperature and shelf-life desired. Since 2-PAM dosage forms are intended for emergency use only, and hopefully only rarely at that, turnover of stocks will be slow. Because of rarity of use, there is a tendency to overlook expiry date. On the other hand, these dosage forms must be entirely capable of eliciting the desired effects at the critical moment of need. Thus, for maximum safety to the patient, these forms must possess extremely good chemical stability, even at the elevated temperatures to which they might conceivably be exposed during storage.

R. I. Ellin et al (J. Pharm. Sci., 51, 141 (1962)) and Fan et al. (J. Pharm. Pharmacol., 16, 493 (1964)) have studied the Kinetics of 2-PAM degradation in dilute (0.002% to 0.2% w./v.) solution. R. I. Ellin et al. have shown that at pH 4.3 these solutions possess maximum stability with a chemical half-life of 60 years at 25° C. These authors have also shown that as pH deviates from this optimum value in either direction stability is significantly reduced, the degree of reduction being directly related to the magnitude of deviation. While the stability of these dilute 2-PAM solutions at pH 4.3 would be considered quite acceptable for a 2-PAM dosage form, the concentration tested would require injection of large volumes of solution in order to obtain the dosage required for therapeutic effect. Attempts to prepare more concentrated solutions have resulted in a realization that stability decreases as concentration is increased.

De Luca, P. and Lachman, L. in Belgian Pat. No. 677,444 have described the incorporation of antioxidant agents into concentrated 2–PAM solutions for the expressed purpose of stabilizing the solutions. While antioxidants do minimize the darekning of 2–PAM solutions arising from oxidation of the hydrolytic degradation products, they are not effective in decreasing the rate at which these hydrolytic reactions occur. The hydrolysis reaction becomes so pronounced in the concentration range required for practical dosage that a permanent solution dosage form has been considered not possible due to lack of adequate chemical stability. As a consequence of these findings, the presently available parenteral dosage forms of 2–PAM are supplied as a stable dry powder which must be reconstituted with a suitable diluent at the time of use.

The discovery that certain gaseous organophosphates are extremely potent cholinesterase inhibitors and thus toxic to humans resulted in their development as potential warfare agents. This development then stimulated search for antidotes which could be used by military personnel on the battlefield under direct nerve gas attack. To date, the combination of atropine and 2–PAM is still the antidote of choice for cholinesterase inhibitors. However, their usefulness under battlefield conditions is severely limited due to their present cumbersome form, requiring transport of a relatively bulky package consisting of a vial of powder, a vial of diluent and a separate hypodermic syringe, and necessitating precious time for sterile reconstitution under adverse conditions.

It was therefore an objective of this invention to provide a stabilized 2–PAM solution of sufficient concentration to enable ready administration of a therapeutic parenteral dose. It was a further objective of this invention to provide a stabilized 2–PAM solution which could be packaged in any of the currently available disposable syringe devices, thus minimizing package size and eliminating the disadvantage associated with the reconstitutible form described above. Another objective of this invention was to provide a stabilized concentrated solution of 2–PAM which could be used with any of the currently available autoinjector devices, to enable military personnel to administer a therapeutic parenteral dose to themselves immediately upon being exposed to nerve gases. It was a final objective of this invention to provide a stabilized concentrated 2–PAM solution containing a therapeutic dose of atropine for single parenteral administration of both life saving antidotes.

I have found that all of these objectives can be attained with the practice of my invention for stabilizing concentrated 2–PAM solutions, which I shall now describe.

I have found that aqueous 2–PAM solutions at concentrations greater than 10% w./v., and ranging to the aqueous solubility of the particular salt at the temperature used, can be stabilized by the addition of an inorganic acid such as hydrochloric acid, nitric acid, sulfuric acid or perchloric acid, the amount of acid required being dependent upon the concentration of 2–PAM desired in solution and sufficient to adjust the pH of the solution to one within the range 1.0 to 3.0. For example, I have prepared a solution of 2–PAM chloride containing 330 mg. of the salt per ml. of solution, the pH of the solution being adjusted to 1.3 by the addition of hydrochloric acid. I have stored this solution for one year at 45° C. (113° F.) and have found 98% of the 2–PAM content after this grossly accelerated storage condition. In contradistinction to this finding is the reported chemical half-life for 0.1% 2–PAM solution at pH 1.3 of 10 days at 37° C.

This solution has been injected intramuscularly into rabbits and the injection site has been examined histologically and compared to that from the presently marketed reconstituted powder form. No differences were observed in this testing.

I have also found that this same stability result at 33% w./v. concentration can be obtained using the nitrate, hydrogensulfate, fumarate, lactate, tartrate or methane sulfonate salt of 2–PAM, and is independent of the inorganic acid used to adjust the pH as long as solubility is not affected. For example, sulfuric and perchloric acids have similarly been employed to obtain the desired pH and essentially identical stability.

Furthermore, I have found that atropine sulfate at a concentration up to 5 mg./ml. can be added to all of these solutions without affecting the stability of the 2–PAM. I have also found that the atropine in these solutions at pH 1.3 is relatively unstable at 45° C., having a chemical half-life of less than one year. However, I have been able to prepare combination solutions of 2–PAM chloride (330 mg./ml.) and atropine sulfate (2 mg./ml.) with the pH adjusted to 2.0 with any of the inorganic acids listed above. These solutions exhibit negligible loss of 2–PAM after one year storage at 25° C. and approximately 5% loss of 2–PAM after one year at 37° C. While the atropine loss from these solutions was more rapid than the 2–PAM, 3% in one year at 25° C. and 7% in one year at 37° C., these solutions can be considered to possess adequate stability for three years at 25° C. Shelf-life may be extended by the incorporation of an overage of either or both of the antidotal agents.

In the practice of my invention I prefer to use 2–PAM chloride as the soluble form for preparing the solution. As the inorganic acid stabilizer I prefer to use hydrochloric acid. For the combination antidotal solution composed of 2–PAM and atropine I prefer to use atropine sulfate as the source of soluble atropine.

The following specific examples will serve to illustrate the extent of this invention and should not be considered as limiting it in any way.

EXAMPLE 1

2–PAM chloride—33.3 gm.
Hydrochloric acid 1.0 N q.s. to pH 1.3
Water for injection U.S.P. q.s.—100.0 ml.

The 2–PAM chloride is dissolved in about 90 ml. of water for injection. The pH is adjusted to pH 1.3 with 1.0 N hydrochloric acid. The volume is brought up to 100 ml. with water for injection. The solution is sterilized by filtration through a Millipore® filter using the HA pad with prefilter disc.

The stability of this solution was determined in 20 ml. Pyrex glass ampules and 20 ml. Type I clear glass vials sealed with FI 68 gray butyl (West 860) closures.

The following stability data were obtained after 1 year, expressed as percent 2–PAM chloride remaining.

45° C.:
    Ampules _____ 96
    Vials _____ 96.5
37° C.:
    Ampules _____ 100
    Vials _____ 99.9
25° C.:
    Ampules _____ 100
    Vials _____ 100

EXAMPLE 2

2–PAM methane sulfonate—25 gm.
Sulfuric acid, U.S.P. 1.0 N q.s. to pH 1.5
Water for injection, U.S.P. q.s.—100 ml.

The procedure used to prepare the solution is similar to that described in Example I except the pH was adjusted to 1.5 with 1.0 N sulfuric acid.

The following results were obtained after 1 year, expressed as percent remaining.

45° C.:
    Ampules _____ 98
    Vials _____ 98.2
37° C.:
    Ampules _____ 100
    Vials _____ 99.8
25° C.:
    Ampules _____ 100
    Vials _____ 100

EXAMPLE 3

2–PAM chloride—10 gm.
Atropine sulfate, U.S.P.—0.30 gm.
Perchloric acid, U.S.P. 1.0 M q.s. to pH 2.0
Water for injection U.S.P. q.s.—100 ml.

The procedure used to prepare the above solution is similar to that described in Example 1 except the 2–PAM chloride and atropine sulfate are dissolved in 90 ml. of water and the pH is adjusted with 1.0 M perchloric acid.

The following stability results were obtained expressed as percent remaining after 1 year.

|  | 45° C. | | 37° C. | | 25° C. | |
| --- | --- | --- | --- | --- | --- | --- |
|  | Ampules | Vials | Ampules | Vials | Ampules | Vials |
| 2-PAM chloride | 98 | 98 | 100 | 100 | 100 | 100 |
| Atropine sulfate |  |  | 94 | 95 | 98 | 98 |

EXAMPLE 4

|  | Input | Claim |
| --- | --- | --- |
| 2-PAM chloride, gm | 33.00 | 30.0 |
| Atropine sulfate, U.S.P., gm | 0.44 | 0.4 |
| Hydrochloric acid 1.0N Q.S. to pH 2.0 |  |  |
| Water for injection, U.S.P. Q.S., ml | 100.0 |  |

The procedure used to prepare this solution was the same as that described in Example 3. The following stability data were obtained expressed a percent of claim after one year storage.

|  | 45° C. | | 37° C. | | 25° C. | |
| --- | --- | --- | --- | --- | --- | --- |
|  | Ampules | Vials | Ampules | Vials | Ampules | Vials |
| 2-PAM chloride | 101 | 100 | 106 | 105 | 110 | 110 |
| Atropine sulfate | 98 | 98 | 103 | 103 | 107 | 106 |

I claim:

1. A stable, injectable, concentrated, aqueous solution of a 2-formyl-1-methylpyridinium oxime salt which comprises a salt of 2-formyl-1-methylpyridinium oxime present in said aqueous solution at a concentration of at least 10 percent on a weight per volume basis, and an inorganic acid, said inorganic acid being present in said solution in sufficient amount to adjust the pH thereof to one within the range 1.0 to 3.0.

2. A stable, injectable aqueous solution having a pH falling within the range 1.0 to 3.0 as defined in claim 1, which solution additionally contains, dissolved therein, a therapeutic dose of atropine sulfate.

3. A stable, injectable aqueous solution having a pH falling within the range 1.0 to 3.0 as defined in claim 2 wherein said atropine sulfate is present therein in a concentration of from 2 to 5 milligrams per milliliter.

4. A stable, injectable aqueous solution having a pH falling within the range 1.0 to 3.0 as defined in claim 1 wherein said salt of 2-formyl-1-methylpyridinium oxime is selected from the group which consists of the chloride, nitrate, hydrogensulfate, fumarate, lactate, tartrate and methanesulfonate salts thereof.

5. A stable, injectable aqueous solution having a pH falling within the range 1.0 to 3.0 as defined in claim 1 wherein said inorganic acid is selected from the group which consists of hydrochloric acid, nitric acid, sulfuric acid and perchloric acid.

6. A stable, injectable aqueous solution having a pH falling within the range 1.0 to 3.0 as defined in claim 1 wherein said salt of 2-formyl-1-methylpyridinium oxime is the chloride salt.

7. A stable, injectable aqueous solution having a pH falling within the range 1.0 to 3.0 as defined in claim 1 wherein said inorganic acid present in amount sufficient to adjust the pH of said solution to one within the specified range is hydrochloric acid.

8. A stable, injectable, concentrated, aqueous solution of 2-formyl-1-methylpyridinium oxime salt which comprises a salt of 2-formyl-1-methylpyridinium oxime present in said solution at a concentration, on a weight per volume basis, ranging from approximately 10 percent to the aqueous solubility of said salt at the temperature of said solution, there being also present therein an inorganic acid in sufficient amount to adjust the pH of said solution to one within the range 1.0 to 3.0.

9. A stable, injectable aqueous solution having a pH falling within the range 1.0 to 3.0 as defined in claim 8, said solution containing, as an additional dissolved ingredient therein, a therapeutic dose of atropine sulfate.

10. A stable, injectable aqueous solution having a pH falling within the range 1.0 to 3.0 as defined in claim 9, wherein said 2-formyl-1-methylpyridinium oxime salt is the chloride salt.

11. A stable, injectable aqueous solution having a pH falling within the range 1.0 to 3.0 as defined in claim 8, wherein said inorganic acid is hydrochloric acid.

References Cited

UNITED STATES PATENTS 2,996,510   8/1961   Green   424—263

OTHER REFERENCES

Konecny: Chem. Abst., vol. 61 (1964), p. 14474g.

Hae et al.: Chem. Abst., vol. 54 (1960), pp. 12480i–12481.

SAM ROSEN, Primary Examiner

U.S. Cl. X.R.

260—296